(12) United States Patent
Misada

(10) Patent No.: US 6,626,794 B2
(45) Date of Patent: Sep. 30, 2003

(54) TOROIDAL TYPE CONTINUOUSLY VARIABLE TRANSMISSION

(75) Inventor: Yasuharu Misada, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/801,716

(22) Filed: Mar. 9, 2001

(65) Prior Publication Data

US 2001/0023215 A1 Sep. 20, 2001

(30) Foreign Application Priority Data

Mar. 10, 2000 (JP) .................. 2000-067273

(51) Int. Cl.⁷ .................................. F16H 15/08
(52) U.S. Cl. .......................................... 476/10
(58) Field of Search .................. 475/208, 216; 476/10

(56) References Cited

U.S. PATENT DOCUMENTS 5,338,268 A * 8/1994 Greenwood ................ 476/10
6,162,144 A * 12/2000 Haka ....................... 476/10

FOREIGN PATENT DOCUMENTS

| EP | 0 207 184 | 7/1985 |
| GB | 1167342 | 10/1969 |
| GB | 1269896 | 4/1972 |
| JP | 11-153202 | 6/1999 |

* cited by examiner

Primary Examiner—Christopher P. Schwartz
(74) Attorney, Agent, or Firm—Rabin & Berdo, PC

(57) ABSTRACT

A toroidal type continuously variable transmission transmits a torque from an input disk to an output disk through a plurality of groups of rollers interposed between the input disk and the output disk. Respective carriages for the rollers are connected to one another by a connecting member. A hydraulic actuator collectively applies forces against torque transmission reactive forces respectively received by the rollers to the rollers through the connecting member and the corresponding carriages.

15 Claims, 6 Drawing Sheets

TOROIDAL TYPE CONTINUOUSLY VARIABLE TRANSMISSION

CROSS REFERENCE TO RELATED APPLICATION

The application claims priority benefits under USC §119 of Japanese Patent Application Serial No. 2000-67273, the disclosure of which is incorporated by reference.

BACKGROUND OF THE INVENTION

1. Field of the Invention

The present invention relates to a toroidal type continuously variable transmission in which a roller is arranged in a toroidal cavity formed between an input disk and an output disk.

2. Description of Related Art

In this type of toroidal type continuously variable transmission, a plurality of groups of rollers whose positions are variable transmit a tractive force between corresponding raceway surfaces, parts of which are in a toroidal shape, formed on opposite surfaces of coaxial disks for input and output which rotate in opposite directions, as disclosed in JP-A-6-502476. The input disk and the output disk respectively have center holes through which an input shaft connecting with a power source is to be inserted. The input disk is connected to the input shaft so as to be integrally rotatable, and the output disk is supported on the input shaft so as to be rotatable.

The rotational speed transmitted from the input disk to the output disk varies when the position of the roller is changed. That is, when the roller is brought into contact with the input disk at a relatively high radius position, and is brought into contact with the output disk at a relatively low radius position, the output disk rotates earlier than the input disk, and a variator is set to a high gear ratio.

On the other hand, when the roller is brought into contact with the input disk at a relatively low radius position, and is brought into contact with the output disk at a relatively high radius position, the output disk rotates slower than the input disk, and the variator is set to a low gear ratio.

Generally, the roller is supported so as to be rotatable by a carriage extending in a direction perpendicular to its supporting shaft, and the axis of the carriage is inclined at a predetermined caster angle to a plane including a center circle of a torus.

Furthermore, the input disk and the output disk are urged in the direction nearer to each other by a hydraulic cylinder for disk urging. On the other hand, each of the rollers is urged in such a direction as to be pressed against the raceway surface of the disk by a corresponding hydraulic cylinder for roller urging through the carriage for supporting the roller.

Oil pressures respectively created by a lot of hydraulic cylinders, described above, are controlled, to apply a force to be balanced with a torque transmission force received by the roller to the roller through the carriage. Consequently, the angle of the roller varies such that a torque generated by the output disk is balanced with a torque generated by the input disk, to maintain the torques at a suitable ratio.

Actually, there is an inherent torque load received by the roller with respect to various types of combinations of various indispensable parameters (for example, a request by an operator, an engine load, an engine speed, and a final output speed). Accordingly, the control system receives inputs representing all the indispensable parameters, to set, when the torque ratio of the input disk to the output disk is suitably maintained, suitable oil pressure conforming to a torque reactive force received by the roller in each of the hydraulic cylinders.

As described in the foregoing, hydraulic cylinders for roller urging, whose number corresponds to the number of rollers, are required. Accordingly, the number of parts is large, and the amount of hydraulic fluid to be used is large.

Moreover, the number of sealing portions of the hydraulic fluid is increased. Accordingly, the possibility that oil leaks is increased.

Furthermore, friction produced when each of the hydraulic cylinders is operated is added. Accordingly, the friction is large as the whole of the continuously variable transmission, and hysteresis easily occurs in the operation of the continuously variable transmission. When the friction is further increased because seals of the sealing portions wear, the roller may vibrate due to the hysteresis.

The present invention has been made in view of the above-mentioned problems, and its object is to provide a toroidal type continuously variable transmission whose construction can be simplified and whose stable operation can be ensured.

SUMMARY OF THE INVENTION

In order to attain the above-mentioned object, a preferred mode of the present invention provides a toroidal type continuously variable transmission comprising an input disk supported on a rotating shaft so as to be integrally rotatable; an output disk supported on the rotating shaft so as to be relatively rotatable: at least one toroidal cavity formed between respective raceway surfaces of the input disk and the output disk; a group of rollers arranged in the cavity for providing for torque transmission to a portion between the input disk and the output disk which correspond to each other; a plurality of carriages for respectively supporting the rollers so as to be rotatable; means for connecting the plurality of carriages to one another; and a hydraulic actuator for collectively applying forces against torque transmission reactive forces respectively received by the rollers to the plurality of carriages through the connecting means.

In the present embodiment, a single hydraulic actuator can cope with the plurality of rollers. Accordingly, it is possible to reduce the number of parts and to simplify the construction. Further, the number of sealing portions is smaller, as compared with that in a case where a lot of hydraulic cylinders are used, thereby making it possible to significantly reduce the possibility that oil leaks. Further, friction at the time of the operation is small because the number of sealing portions is small. Even if the friction is somewhat increased because seals of the sealing portions wear by long-term use, the level of the friction is significantly smaller, as compared with that in the conventional example, not to cause the roller to vibrate.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENT

Preferred embodiments of the present invention will be described while referring to the accompanying drawings.

Figure 1:
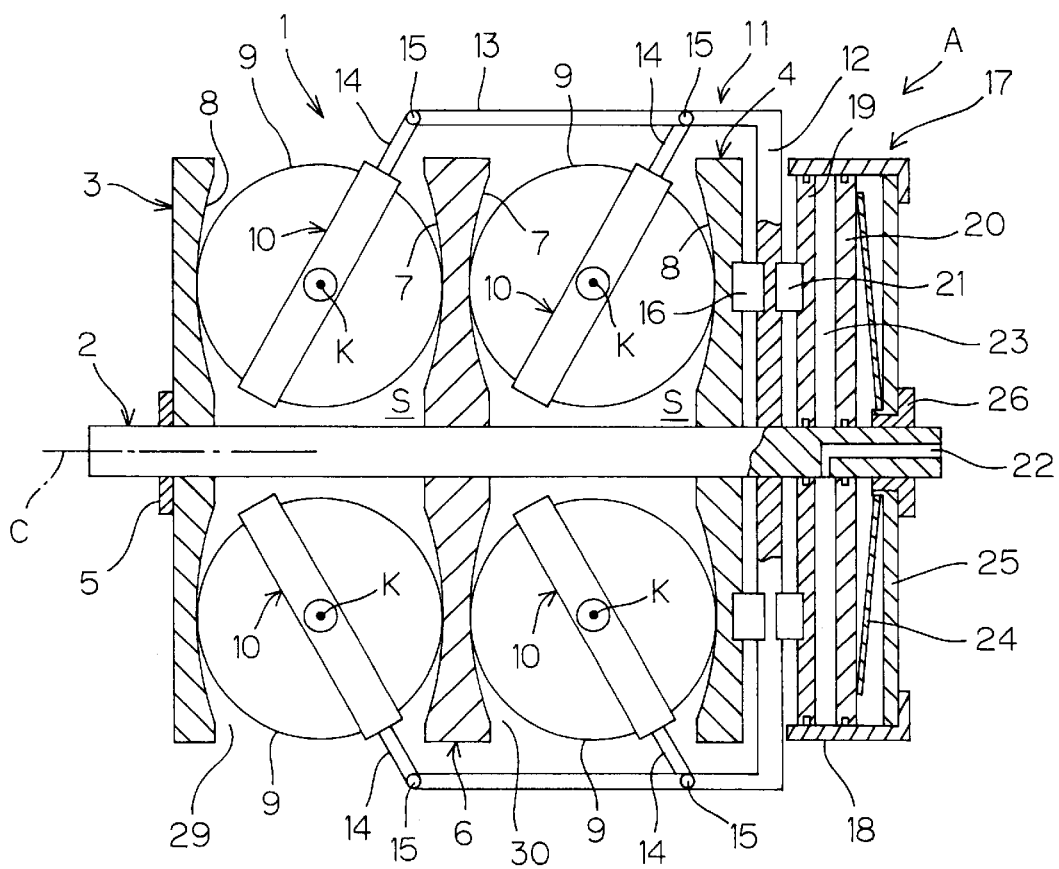
FIG. 1 is a partially broken sectional view of a toroidal type continuously variable transmission according to an embodiment of the present invention.

FIG. 1 is a schematic sectional view of a toroidal type continuously variable transmission according to an embodiment of the present invention. Referring to FIG. 1, a variator 1 in a continuously variable transmission A is of a so-called double cavity type comprising a pair of cavities 29 and 30, and comprises an input shaft 2 driven by a power source of a vehicle. The input shaft 2 supports input disks 3 and 4, respectively, in the vicinities of both its ends. The input disks 3 and 4 are coupled to the input shaft 2 using a key, for example, so that the input disks 3 and 4 are prevented from rotating around the input shaft 2.

The input disk 3 is prevented from moving along the axis of the input shaft 2 by a stopper 5 fixed to the input shaft 2. The other input disk 4 is allowed to move in a limited range relative to the input shaft 2.

An annular output disk 6 constituting an output section of the variator 1 is supported at the center in the axial direction of the input shaft 2 so as to be rotatable and so as to be axially movable. Raceway surfaces 7, parts of which are in a toroidal shape, are formed on both side surfaces of the output disk 6.

A space S, a part of which is in a toroidal shape, is formed between each of the raceway surfaces 7 of the output disk 6 and the input disk 3 or 4 corresponding thereto, and a tractive force is transmitted between a raceway surface 8, a part of which is in a toroidal shape, on each of the input disks 3 and 4 and the raceway surface 7, a part of which is in a toroidal shape, of the output disk 6 opposite thereto through a plurality of (for example, three) rollers 9. Each of the rollers 9 is supported so as to be rotatable around a rotation axis K by a carriage 10.

Figure 2:
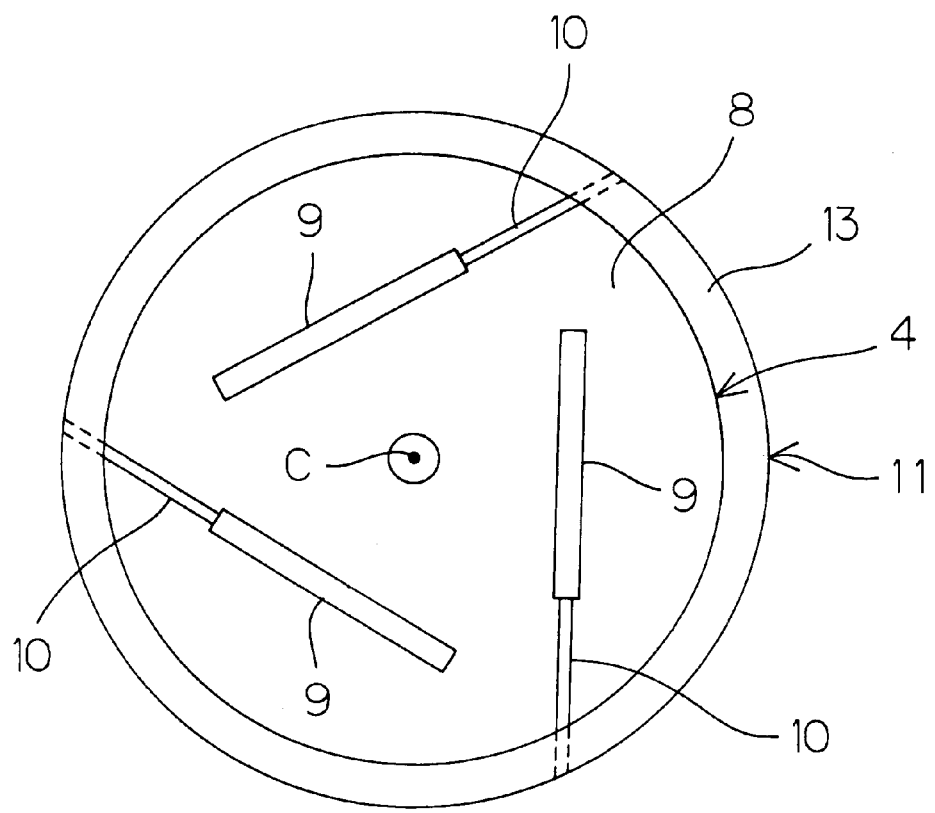
FIG. 2 is a schematic view showing a roller supporting structure of the toroidal type continuously variable transmission.

Three rollers (a set of three rollers) are equally spaced on a circumference having as its center a center axis C of the input shaft 2, as shown in FIG. 2. The positions of the six rollers are controlled, to transmit a change gear ratio which is always equal during the operation.

All the carriages 10 are connected to one another through a connecting member 11. The connecting member 11 is opposite to a rear surface of the raceway surface 8 of the input disk 4, and comprises a disk-shaped main section 12 which is rotatable relative to the input shaft 2, a supporting section 13 extending from an outer edge of the main section 12 and forming a cylindrical shape concentric with the input shaft 2, and a connecting section 15 for connecting a base end of a supporting arm 14 of each of the carriages 10 to the supporting section 13. As the connecting section 15, a coupling having a high degree of freedom, for example, a spherical bearing can be exemplified.

Between the main section 12 of the connecting member 11 and the input disk 4, a thrust bearing 16 for allowing relative rotation therebetween is interposed.

On the other hand, a hydraulic actuator 17 for applying a force against a torque transmission reactive force to all the rollers 9 through the connecting member 11 and pressing the input disk 4 toward the output disk 6 through the main section 12 is arranged opposite to the input disk 4 with the main section 12 of the connecting member 11 interposed therebetween.

The hydraulic actuator 17 comprises a cylinder 18 concentric with the input shaft 2, and a pair of annular partition walls 19 and 20 respectively sealing a portion between the cylinder 18 and the input shaft 2 and opposite to each other so as to be movable along the axis of the input shaft 2. Between the partition wall 19 and the main section 12 of the connecting member 11, a thrust bearing 21 for allowing relative rotation is interposed. Further, an annular oil chamber 23 which is supplied with oil from a filler opening 22 penetrating the input shaft 2 is defined between the partition walls 19 and 20.

Furthermore, an annular end wall 25 is opposite to the partition wall 20 with an elastic member 24 such as a belleville spring interposed therebetween. The axial movement of the end wall 25 relative to the input shaft 2 is regulated by a stopper 26.

An urging force produced by oil pressure in the elastic member 24 and the oil chamber 23 urges the input disk 4 in the direction nearer to the input disk 3 on the fixed side through the partition wall 19, the thrust bearing 21, the main section 12, and the thrust bearing 16, to apply a force for holding the roller 9 between the corresponding disks. On the other hand, the urging force produced by the oil pressure in the elastic member 24 and the oil chamber 23 applies a force against a torque transmission reactive force to each of the rollers 9 through the partition wall 19, the thrust bearing 21, the connecting member 11 and each of the carriages 10.

In the present embodiment, the single hydraulic actuator 17 can cope with the plurality of rollers 9. Accordingly, it is possible to significantly reduce the number of parts and to significantly simplify the construction. Further, the number of sealing portions is smaller, as compared with that in a case where a lot of hydraulic cylinders are used, thereby making it possible to significantly reduce the possibility that oil leaks. Further, friction at the time of the operation is small because the number of sealing portions is small. Even if the friction is somewhat increased because seals of the sealing portions wear by long-term use, the level of the friction is significantly smaller, as compared with that in the conventional example, not to cause the roller 9 to vibrate.

Particularly, although six hydraulic cylinders have been required for two sets of rollers (six rollers) in a toroidal type continuously variable transmission of a double cavity type in the conventional example, the single hydraulic actuator 17 is sufficient, so that the effect of simplifying the construction is larger in the present embodiment.

The above-mentioned hydraulic actuator 17 is also used as a hydraulic actuator for relatively bringing the input disk 3 or 4 and the output disk 6 near to each other. Accordingly, it is possible to further reduce the number of parts and to simplify the construction. It is possible to reduce the possibility that oil leaks. Further, it is possible to reduce the possibility that the roller vibrates.

Particularly, the input disk 3 or 4 and the output disk 6 are urged in the direction nearer to each other through the connecting member 11 provided to urge the rollers 9.

Accordingly, forces respectively exerted on the rollers 9 can be stably balanced. Therefore, the variable speed operation is smoothed. Moreover, the present embodiment can be realized in simple construction.

Figure 3:
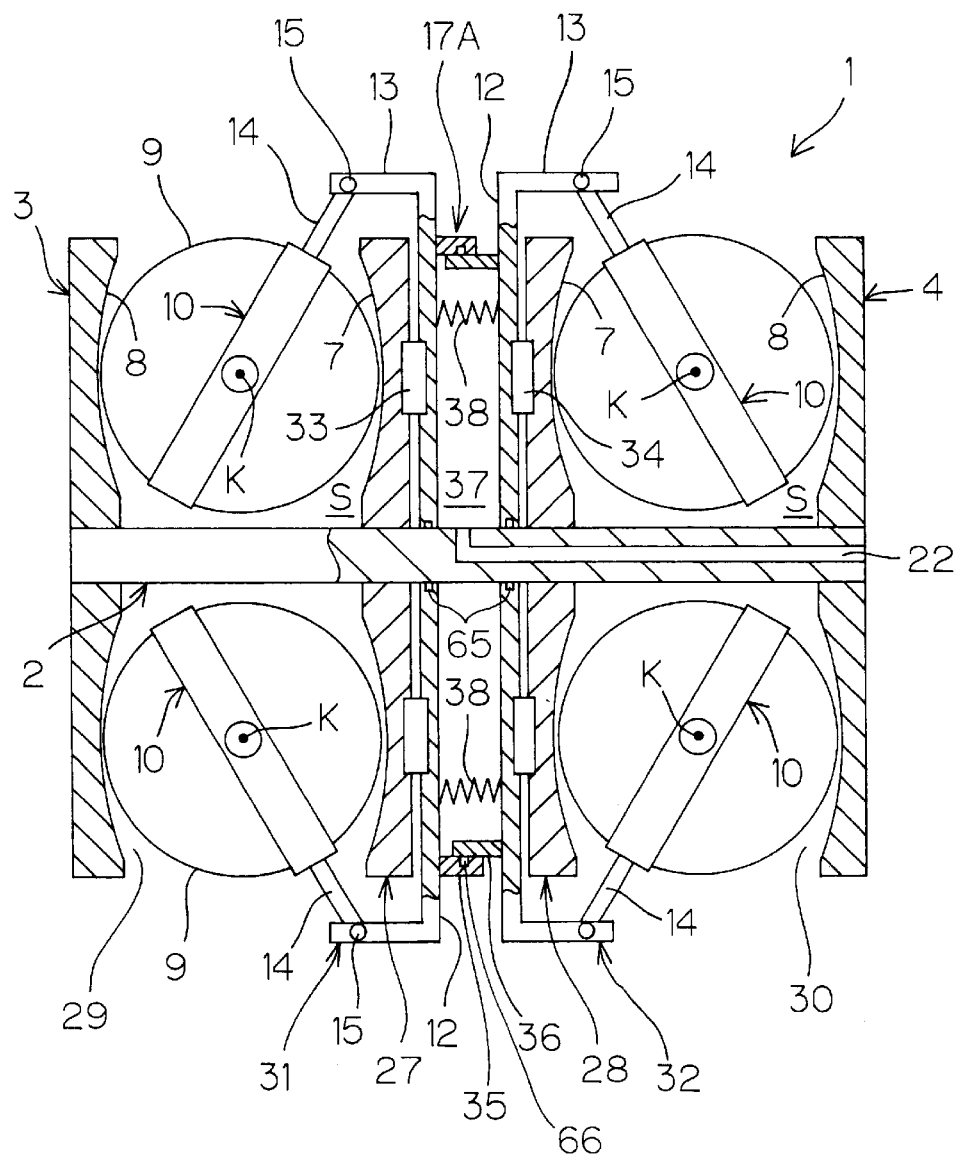
FIG. 3 is a partially broken side view of a toroidal type continuously variable transmission according to another embodiment of the present invention.

FIG. 3 illustrates another embodiment of the present invention. In the present embodiment, a pair of input disks 3 and 4 is rotatable integrally with an input shaft 2 and is prevented from axially moving. A pair of output disks 27 and 28 which are respectively opposite to the input disks 3 and 4 is provided between the input disks 3 and 4. Each of the output disks 27 and 28 is supported on the input shaft 2 so as to be rotatable and so as to be axially movable. A first cavity 29 is formed between the input disk 3 and the output disk 27, and a second cavity 30 is formed between the input disk 4 and the output disk 28. A plurality of rollers 9 arranged in the first cavity 29 are collectively supported by a first connecting member 31, while a plurality of rollers 9 arranged in the second cavity 30 are collectively supported by a second connecting member 32.

The connecting members 31 and 32 are in shapes which are symmetrical to each other, and respectively comprise main sections 12 opposite to rear surfaces of the corresponding output disks 27 and 28 through thrust bearings 33 and 34 and supporting sections 13 extending in opposite directions from outer edges of the main sections 12.

Between the main sections 12 of both the connecting members 31 and 32, an outer cylindrical section 35 extending from one of the main sections 12 and an inner cylindrical section 36 extending from the other main section 12 are fitted to each other, to constitute a hydraulic actuator 17A. The hydraulic actuator 17A is provided with an oil chamber 37 defined between both the main sections 12 around the input shaft 2. Hydraulic fluid is supplied to the oil chamber 37 through a filler opening 22 penetrating the input shaft 2. A seal member 65 is interposed between the inner periphery of each of the main sections 12 and the outer periphery of the input shaft 2, and a seal member 66 is interposed between the outer cylindrical section 35 and the inner cylindrical section 36. The seal members 65 and 66 prevent oil from leaking from the oil chamber 37. Further, an elastic member 38 for urging the main sections 12 in the direction away from each other is interposed between the main sections 12. The elastic member 38 may be one or a plurality of belleville springs or coil springs. The elastic member 38 may be contained in the oil chamber 37, or may be arranged outside the oil chamber 37. Pressure in the oil chamber 37 urges the output disks 27 and 28 in the direction nearer to the corresponding input disks 3 and 4 through the main sections 12 of the connecting members 31 and 32 and the corresponding thrust bearings 33 and 34. Further, pressure in the oil chamber 37 urges the rollers 9 through the corresponding connecting member 31 or 32.

Also in the present embodiment, the same function and effect as those in the embodiment shown in FIG. 1 can be produced, the plurality of rollers 9 can be urged in simple construction using the single hydraulic actuator 17A, and the output disks 27 and 28 corresponding to the input disks 3 and 4 can be urged in the direction nearer to each other. Particularly in the continuously variable transmission of a double cavity type, the rollers 9 in each of the cavities 29 and 30 are collectively urged, so that the effect of simplifying the construction is high. Further, it is possible to prevent the rollers from vibrating due to the increase in friction by reducing the number of sealing portions.

Figure 4:
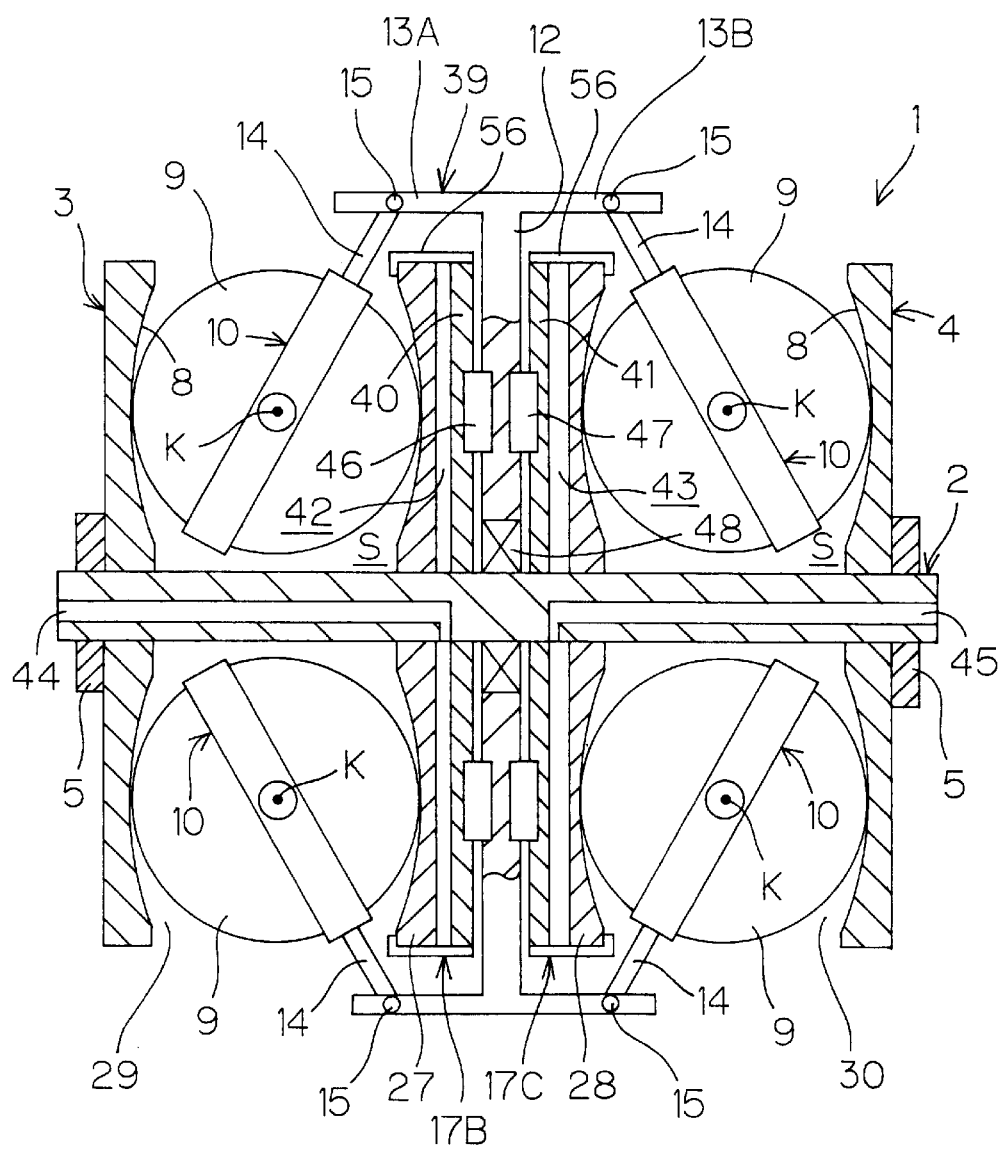
FIG. 4 is a partially broken side view of a toroidal type continuously variable transmission according to still another embodiment of the present invention.

FIG. 4 illustrates still another embodiment of the present invention. Referring to FIG. 4, the present embodiment mainly differs from the embodiment shown in FIG. 3 in that there is provided a connecting member 39 for collectively supporting a pair of rollers 9 of a double cavity type, and oil chambers 42 and 43 are respectively provided between a pair of intermediate members 40 and 41 opposite to each other with a main section 12 of the connecting member 39 interposed therebetween and rear surfaces of corresponding output disks 27 and 28. Reference numeral 56 denotes a cylinder constituting an outer frame of each of the oil chambers 42 and 43. The oil chamber 42 and members 2, 27, 40, and 56 for defining the oil chamber 42 constitute a hydraulic actuator 17B, and the oil chamber 43 and members 2, 28, 41, and 56 for defining the oil chamber 43 constitute a hydraulic actuator 17C. Hydraulic fluid is supplied to the oil chambers 42 and 43 through corresponding filler openings 44 and 45 penetrating the main shaft 2. Supporting sections 13A and 13B extend in both directions parallel to the main shaft 2 from an outer edge of the main section 12, and forms a T shape in cross section. Thrust bearings 46 and 47 are respectively interposed between the main section 12 of the connecting member 39 and the intermediate members 40 and 41. Reference numeral 48 denotes a rolling bearing for supporting the main section 12 of the connecting member 39 on the main shaft 2 so as to be rotatable.

In the present embodiment, respective oil pressures in the oil chambers 42 and 43 urge the corresponding output disks 27 and 28 toward the corresponding input disks 3 and 4, while torque transmission reactive forces respectively received by pairs of groups of rollers in cavities 29 and 30 are autonomically balanced through the connecting member 39. Consequently, a hydraulic actuator for urging the roller 9 through a carriage 10 need not be provided, thereby making it possible to simplify the construction.

Figure 5:
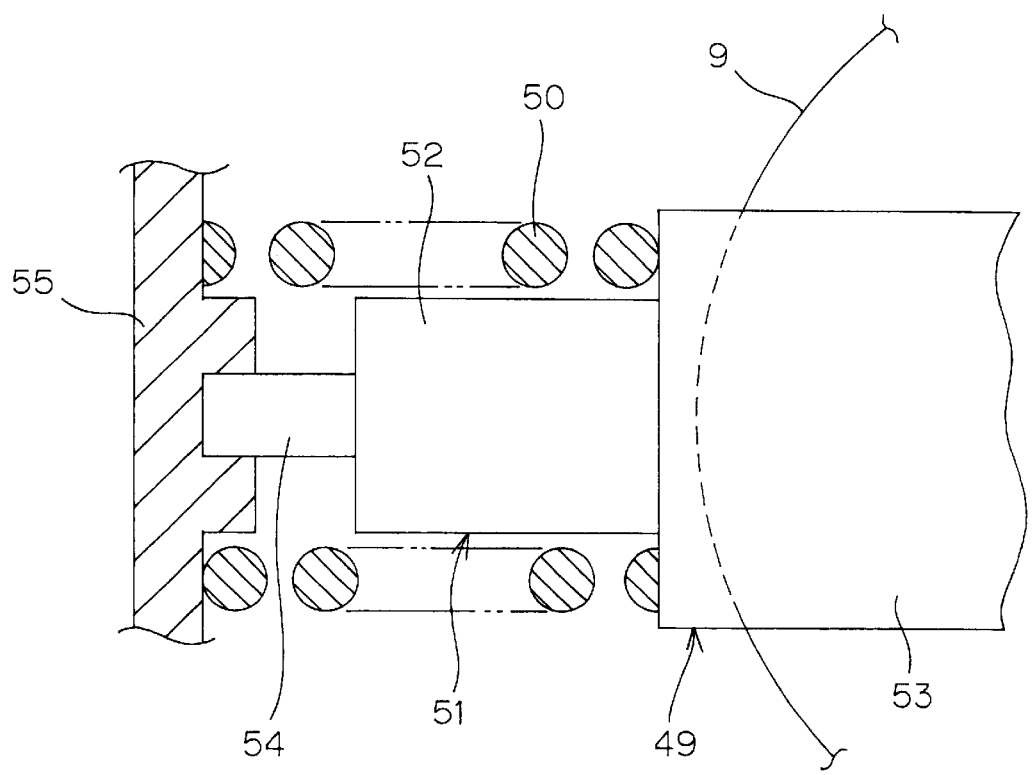
FIG. 5 is a partially broken side view of a principal part of a toroidal type continuously variable transmission according to a further embodiment of the present invention.

FIG. 5 illustrates a roller supporting structure according to a further embodiment of the present invention. Referring to FIG. 5, in the present embodiment, each of carriages 49 comprises a helical compression spring 50 for applying a force against a torque transmission reactive force to a corresponding roller 9 and a fluid damper 51 arranged in a coil of the helical compression spring 50. An end of a cylinder 52 in the fluid damper 51 is fixed to an end of a pair of supporting side plates 53 (only one of them is illustrated in FIG. 5) with the roller 9 interposed on both its sides therebetween, and an end of a piston rod 54 is fixed to a casing 55 of a continuously variable transmission.

In the present embodiment, the necessity of a path for supplying oil pressure to a mechanism for applying the torque transmission reactive force to the rollers 9 is eliminated. Accordingly, the mechanism for applying the torque transmission reactive force to the rollers 9 can be contained in a compact shape in the casing 55, thereby making it possible to contribute to the miniaturization of the continuously variable transmission.

In the present embodiment, a fluid damper is used as a damper; however, other dampers such as a friction damper may be used instead. Further, a plurality of dampers may be combined to be used.

Figure 6:
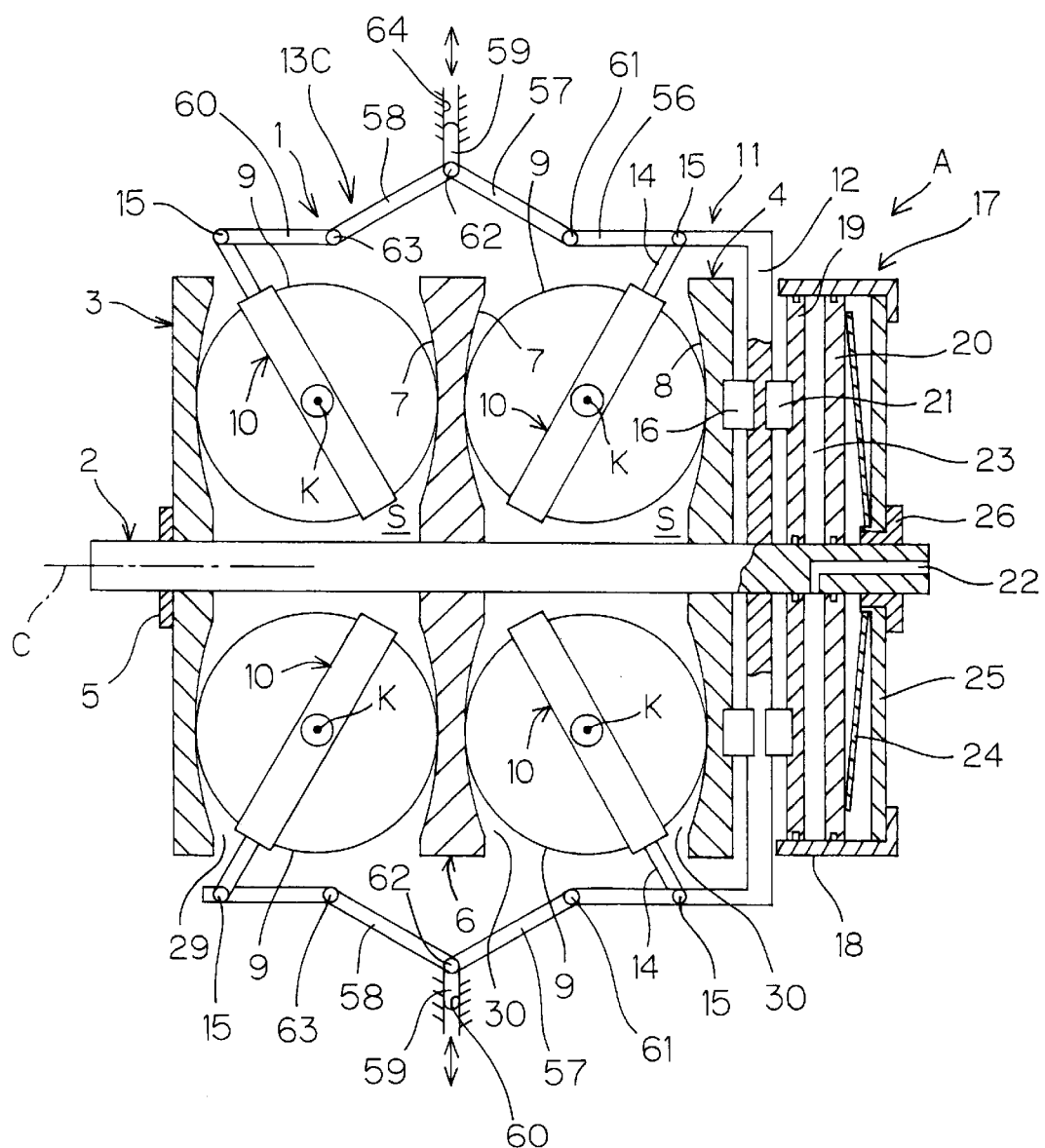
FIG. 6 is a partially broken side view of a toroidal type continuously variable transmission according to a still further embodiment of the present invention.

FIG. 6 illustrates a still further embodiment of the present invention. Referring to FIG. 6, the present embodiment differs from the embodiment shown in FIG. 1 in the following.

Specifically, a carriage 10 in a cavity 29 and a carriage 10 in a cavity 30 are arranged with the carriages 10 inclined in opposite directions. A supporting section 13C included in a connecting member 11 comprises a first cylindrical section 56, a first bar 57, a second bar 58, a guide bar 59, and a second cylindrical section 60. The first cylindrical section 56 extends from a main section 12 parallel to an input shaft 2, and has a connecting section 15 to the carriage 10 in the cavity 30. The second cylindrical section 60 has a connecting section 15 to the carriage 10 in the cavity 29.

Opposite edges of the first and second cylindrical sections 56 and 60 are connected to each other through the first and second bars 57 and 58, to constitute a link mechanism for balancing torque transmission reactive forces received by rollers in both the cavities 29 and 30. That is, the edge of the first cylindrical section 56 is connected to one end of the first bar 57 through a connecting section 61 so as to be rotatable. The other end of the first bar 57 is connected to one end of the second bar 58 through a connecting section 62 so as to be rotatable. The other end of the second bar 58 is connected to the edge of the second cylindrical section 60 through a connecting section 63 so as to be rotatable.

One end of the guide bar 59 is connected to the connecting section 62 between the first and second bars 57 and 58 so as to be rotatable. The guide bar 59 is held in a guide section 64 extending along the radius of the rotating shaft 2 so as to be slidable.

In the present embodiment, the torque transmission reactive forces respectively received by the rollers in both the cavities 29 and 30 can be balanced through the supporting section 13C including the link mechanism.

The present invention is not limited to the above-mentioned embodiments, and can be subjected to various modifications in the range of the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A continuously variable transmission, comprising:
   an input disk supported on a rotating shaft so as to be integrally rotatable;
   an output disk supported on the rotating shaft so as to be relatively rotatable;
   at least one toroidal cavity formed between respective raceway surfaces of the input disk and the output disk;
   a group of rollers arranged in the cavity for providing for torque transmission between the input disk and the output disk;
   a plurality of mechanical carriages for respectively supporting the rollers so as to be rotatable;
   means for mechanically connecting, in a manner that does not utilize hydraulic actuators for effecting the connecting, the plurality of mechanical carriages to one another; and
   a hydraulic actuator for collectively applying forces against torque transmission reactive forces respectively received by the rollers to the plurality of mechanical carriages through the connecting means.

2. The continuously variable transmission according to claim 1, wherein
   the hydraulic actuator urges at least one of the input disk and the output disk so that they may come relatively closer to each other.

3. The continuously variable transmission according to claim 1, wherein
   the hydraulic actuator urges at least one of the input disk and the output disk through the connecting means so that they may come relatively closer to each other.

4. The continuously variable transmission according to claim 1, wherein
   the connecting means comprises an annular main section supported on the rotating shaft so as to be rotatable, a supporting section extending from an outer edge of the main section parallel to the rotating shaft, and a plurality of connecting sections for connecting the supporting section to each of the carriages,
   the main section being opposite to a rear surface of either one of the raceway surfaces of the input disk and the output disk through a thrust bearing.

5. The continuously variable transmission according to claim 4, wherein
   the main section is interposed between the rear surface of either one of the raceway surfaces of the input disk and the output disk and the hydraulic actuator,
   the hydraulic actuator urging at least one of the input disk and the output disk through the main section so that they may come relatively closer to each other.

6. The continuously variable transmission according to claim 5, wherein
   the hydraulic actuator includes an oil chamber, a part of which is defined by the main section.

7. The continuously variable transmission according to claim 4, wherein
   at least one of the input disk and the output disk includes a disk opposite to the main section through an intermediate member, and
   the hydraulic actuator includes an oil chamber between the disk opposite to the main section through the intermediate member and the intermediate member.

8. The continuously variable transmission according to claim 1, wherein
   the at least one cavity includes a pair of cavities, and
   the connecting means comprises means for connecting carriages corresponding to all rollers in the pair of cavities.

9. The continuously variable transmission according to claim 8, wherein
   the means for connecting the carriages corresponding to all the rollers in the pair of cavities comprises means for balancing a torque transmission reactive force received by the group of rollers in one of the cavities and a torque transmission reactive force received by the group of rollers in the other cavity through itself.

10. The continuously variable transmission according to claim 9, wherein
    the connecting means comprises an annular main section supported on the rotating shaft so as to be rotatable and so as to be axially movable, a pair of supporting sections extending from an outer edge of the main section to both its sides parallel to the rotating shaft, and a plurality of connecting sections for respectively connecting the supporting sections to the corresponding carriages, and
    the balancing means includes the pair of supporting sections.

11. The continuously variable transmission according to claim 10, wherein
    the input disk and the output disk include a pair of disks respectively opposite to the main section through intermediate members,
    the pair of disks and the corresponding intermediate members are relatively rotatable, respectively, through thrust bearings, and the hydraulic actuator includes a pair of hydraulic actuators for respectively defining oil chambers between the pair of disks and the corresponding intermediate members.

12. The continuously variable transmission according to claim 9, wherein the balancing means includes means for connecting the carriages in the pair of cavities through link mechanisms.

13. The continuously variable transmission according to claim 1, wherein the at least one cavity includes a pair of cavities, and the connecting means includes a pair of connecting members respectively corresponding to the cavities, each of the connecting members connecting the carriages corresponding to the rollers in the corresponding cavity to each other.

14. The continuously variable transmission according to claim 13, wherein the hydraulic actuator is interposed between the connecting members.

15. The continuously variable transmission according to claim 14, wherein the connecting members respectively comprise annular main sections supported on the rotating shaft so as to be rotatable and so as to be axially movable, the respective main sections in the connecting members are opposite to each other, and the hydraulic actuator includes an oil chamber between the main sections in the connecting members.

* * * * *